United States Patent [19]

Jones

[11] 3,911,256

[45] Oct. 7, 1975

[54] APPARATUS FOR TESTING AND ANALYZING FLUID MIXTURE

[76] Inventor: Ray L. Jones, 258 Paseo de Granada, Redondo Beach, Calif. 90277

[22] Filed: Dec. 19, 1973

[21] Appl. No.: 426,332

[52] U.S. Cl............ 235/151.3; 73/61 R; 73/61.1 R; 137/101.11
[51] Int. Cl.² ......................................... G01N 7/10
[58] Field of Search....... 235/151.3, 151.34, 151.35; 73/19, 61 R, 61.1 R, 64; 137/88, 89, 91, 101.11

[56] References Cited
UNITED STATES PATENTS

| | | | |
|---|---|---|---|
| 3,222,918 | 12/1965 | Kuntz et al...................... | 73/61 R X |
| 3,304,766 | 2/1967 | Hubby.............................. | 73/61.1 R |
| 3,488,996 | 1/1970 | Pfrehm............................. | 73/61.1 R |
| 3,528,282 | 9/1970 | Stotts et al....................... | 73/61.1 R |
| 3,638,476 | 2/1972 | Paterson et al. ................. | 73/61.1 R |

Primary Examiner—Malcolm A. Morrison
Assistant Examiner—Jerry Smith
Attorney, Agent, or Firm—Georges A. Maxwell

[57] ABSTRACT

An apparatus for testing a fluid mixture of gas and two liquids of different, known, specific gravity to determine the proportion of each of the ingredients comprising fluid handling means operable to receive and isolate a predetermined volumetric portion of the whole cross-section of a flow stream of said fluid without interruption of flow of said stream, means to measure the pressure of the isolated volume of fluid and to effect compression of the gas content thereof whereby the volume of gas can be methematically determined by Boyle's Law and means to measure the hydrostatic head pressure of the isolated fluid to determine the weight thereof, whereby the volume of gas and of each liquid in the fluid can be determined by mathematic comparative calculations.

10 Claims, 3 Drawing Figures

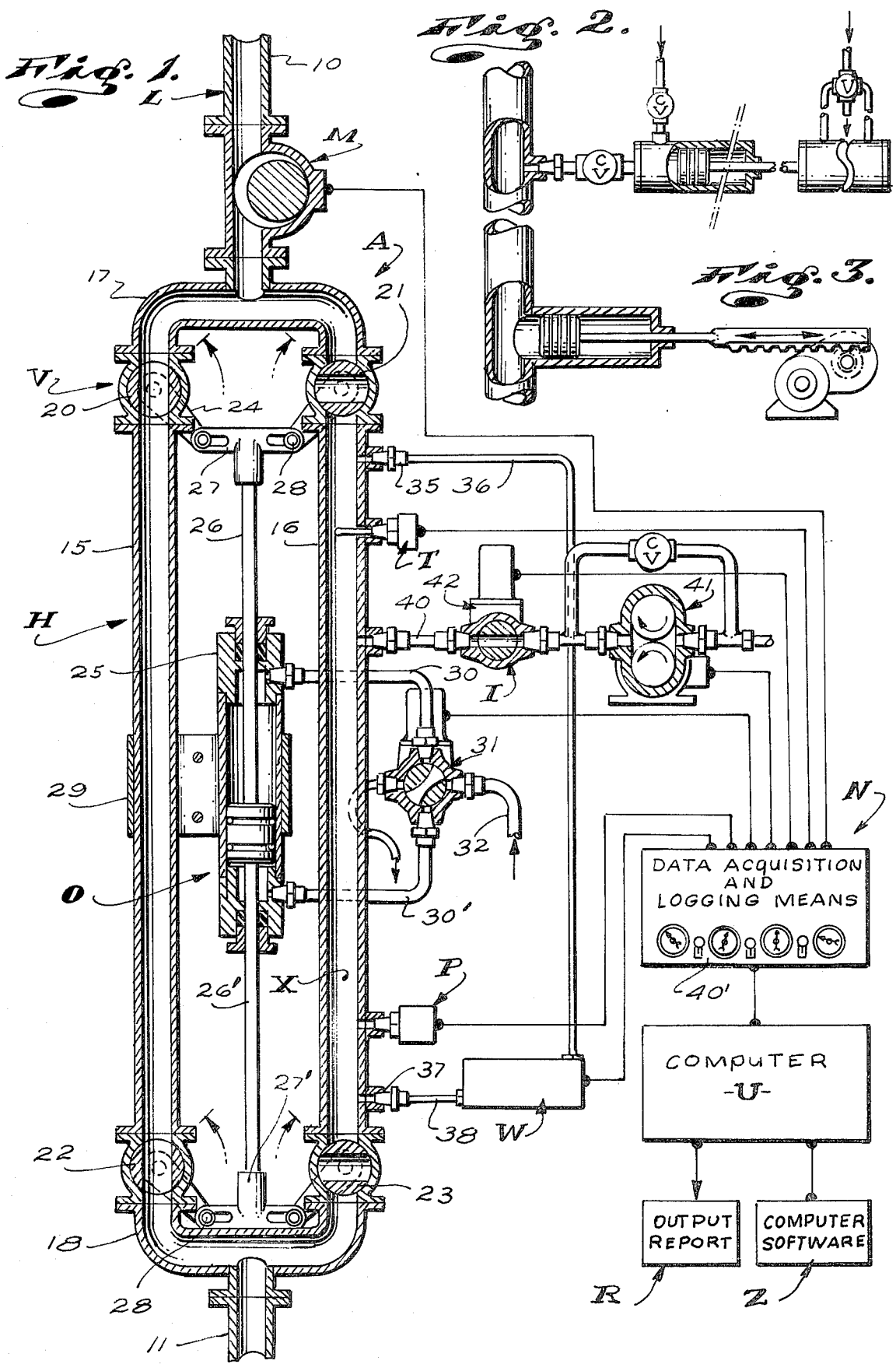

APPARATUS FOR TESTING AND ANALYZING FLUID MIXTURE

This invention has to do with the testing of fluid mixtures flowing through fluid conductors or lines and is more particularly concerned with a novel apparatus which is particularly suitable for testing and determining the net oil contained in the production fluid flowing from oil wells.

While my invention is suitable for use in testing many different fluid mixtures in and throughout the various arts, it is particularly suitable for use in the art of oil production; accordingly, and so as not to unduly burden this disclosure by reciting all uses and applications of my invention, I will limit this disclosure of the invention as it relates to the oil production art or industry.

In the majority of oil producing wells, the fluid produced, that is, the fluid flowing or being pumped from the wells is not pure oil but is a mixture of oil, water, gas and oftentimes a small amount of solids such as sand.

In most cases the production from an oil well includes oil, gas and water in a free state, and the same materials in emulsion or a homogenous condition. Whenever water is present, the oil produced from a well, due to its hygroscopic nature, contains water and is said to be "wet" as distinguished from water-free or anhydrous oil, which is said to be "dry".

Throughout the oil producing art it is important to determine and to know what the net oil production from a well is and to know the volume of gas and/or water it carries or is mixed with.

Knowledge of the above noted factors is required by governmental statistical and regulatory agencies to effectively control oil production and protect oil reserves. It is important to the oil producer in that it enables him to determine the condition and productivity of his well. It is important to the purchasers of crude oil since it enables them to adjust the price paid for the production of a well based upon the net oil produced. It is important in the art of refining crude oil in that advanced knowledge of the water and entrained gases in the crude oil enables the refiner to make proper projections as regards methods or processes to be employed, products to be obtained and both time and costs to be expended.

The foregoing is but a cursory list of reasons for testing the production of oil wells and points to the fact that there exists a great need for accurate efficient and dependable testing means.

The most effective and widely used method and apparatus employed to test oil well production fluids to detect and determine the net oil content thereof, as provided by the prior art, consists of a large receiving tank into which a predetermined volume of production fluid flowing from a well is deposited and let to stand. The effect of gravity on the production causes the free water to settle to the bottom of the tank, the oil to raise to the top of the settled water and the gas to rise above the oil. The noted receiving tank is referred to as a three phase separator. The gas is let to escape from the tank and the remaining volumes of water and crude oil are measured. The crude oil is then tested to determine its water content or wetness by means of a capacitance probe, which probe measures the change in dielectric constant of fluids flowing through a capacitor cell compared to some index material, such as a sample of dry oil. In addition to the above, factors such as the temperature of the production fluid and the separated fluids are taken and suitably correlated.

It will be apparent that by utilizing such apparatus and following the above procedures, a fair estimate of the net oil produced can be arrived at.

It takes many hours and frequently days for the emulsions of oil, water and gas produced by wells to separate in the receiving tanks or separators referred to above. Further, the capacitance probes employed are extremely sensitive to numerous external factors and are not dependable.

The apparatus is semi-automatically operated. The data is acquired by visual and manual means, is manually recorded and is subsequently utilized in carrying out suitable mathematical calculations in order to obtain the sought after answers or information. In practice, the recorded and/or collected data is frequently related with suitable computer software, fed into a computer and the desired information is fed out by the computer, eliminating the expenditure of the considerable time otherwise required in working out the mathematical problems encountered.

The above noted apparatus is necessarily large and cumbersome and is such that it requires the exercise of great care by highly skilled technicians in effecting its satisfactory operation.

With the availability and acceptance of the above noted apparatus and related method of testing production fluid for net oil, an error of $\pm 10\%$ on 75% of wells tested has been accepted as allowable or permissible.

An error factor found to exist in the method practiced and/or the apparatus employed by the prior art resides in the fact that the three phase separators or receiving tanks of the apparatus are filled by tapping and bypassing a portion of the production fluid of a well, as it flows through a production delivery line. It has been found that the different materials in production fluid flowing through a delivery line, as a result of line friction, turbulence and the effects of gravity, temperature changes and the like, tend to separate, stratify and/or establish segregated flow patterns in the line. As a result of the above, tapping off of a portion of the fluid flowing through a line, from one side of the line, as is common practice, for obtaining testing samples, frequently results in a sample, the material make up of which is not truly representative of the material make up of the entire flow stream. As a result, test results are not true and accurate.

An object and feature of my invention is to provide an apparatus to facilitate testing and detecting the net oil content of oil well production fluid wherein a complete sample section of the complete flow stream of production fluid is easily, effective and efficiently separated from the flow stream for testing purposes.

Another object and feature of my invention is to provide an apparatus which rapidly and accurately detects and records the rate of flow of the fluid being tested and the volume, weight and temperature of a sample of said fluid under different pressures, whereby the volumes of oil gas and water in the fluid can be accurately and rapidly determined.

It is an object and feature of my invention to provide an apparatus of the character referred to which is such that the rate of flow of production fluid is monitored by a flow meter, the volume of test fluid is determined by volumetric area of a sample receiving chamber, the temperature of the sample tested is monitored by a thermo-probe entering the chamber, the weight of the sample tested is determined by the hydrstatic head of the column of the sample, the pressure of the sample is determined and monitored by a pressure sensitive transducer communicating with said chamber and the pressure on the sample is varied by changing the volume of the chamber as by means of a cylinder and ram unit or by changing the volume of liquid as by injection of a measured volume of water or other liquid into the chamber.

It is yet another object and feature of my invention to provide an apparatus which is operable to rapidly and accurately determine necessary data for calculating the volume of free and entrained gas in a test sample of production fluid by application of Boyles Law, by compressing or expending the gas in the test chamber by fluid injection or extraction or by varying chamber displacement and noting and/or recording the pressure, temperature and volume of the test fluid before and after such compression or expansion of the gas.

Still further, it is an object and feature of my invention to provide an apparatus for rapidly and accurately detecting and noting and/or recording data necessary to determine the net oil and/or the net water content in a sample of production fluid by determining the weight and volume of the gas as set forth above, subtracting the established weight and volume of gas from the weight and volume of the sample to determine the exact weight and volume of oil and water, whereby the net content of oil and water can be calculated by differential comparison of the density of the oil and/or water with the determined volume and weight of the oil and water of the sample.

It is yet another object and feature of my invention to provide an apparatus of the character referred to which is such that the test sample of production fluid need not be let to stand and the gas, water and oil need not be separated in order to determine the net oil content the net gas content and/or the net water content of the fluid. Accordingly, it is an object and feature of my invention to provide an apparatus for the purpose described which is fast operating and such that the data and information sought can be obtained in a small fraction of the time required to obtain the same data and information by employment of the means and apparatus provided by the prior art for obtaining such data and information.

Another object and feature of this invention is to provide an apparatus which is such that it can be made small, neat and compact, and an apparatus which is both easy and economical to make and which is convenient to operate, service and maintain.

The foregoing and other objects and features of my invention will be fully understood from the following detailed description of typical preferred forms and application of my invention, throughout which description reference is made to the accompanying drawings, in which:

FIG. 1 is a diagrammatic view of a typical apparatus embodying my invention.

FIG. 2 is a view of a portion of another embodiment of my invention.

FIG. 3 is a view similar to FIG. 2 showing yet another form of my invention.

Referring to the drawings, the apparatus A that I provide is shown engaged in and between an upstream section 10 and a downstream section 11 of a production flow line L. The flow line extends from an oil well, from a group of wells in a common field, or other source of production fluid and is adapted to deliver production fluid to a desired destination, such as a tank farm, refinery, or the like.

The apparatus A includes a positive displacement flow meter M at its upstream end. The meter M is such that the flow and/or volume of production measured is presented on a read out dial and/or is translated into an electrical signal for transmission to suitable monitoring means, as will hereafter be described. (The meter M can be at any location in the flow stream without affecting the invention).

The meter M can be any one of a number of suitable commercially available meter constructions and is shown as a flanged unit secured to and in direct communication with the section 10 of the line L.

The apparatus A that I provide next includes fluid handling means H downstream of and receiving fluid flowing from the meter M and adapted to take fluid samples for testing without interruption of the flow of fluid.

The means H includes a pair of elongate, vertical, fluid conducting pipes 15 and 16 corresponding in crosssection with the flow line L, upper and lower manifolds 17 and 18 at and between the upper and lower ends of the pipes 15 and 16 and communicating with the upper and lower sections 10 and 11 of the line L. The upper manifold 17 connects with the discharge side of the meter M while the lower manifold connects directly with with the lower section 11 of the line L.

The means H further includes valve control means V and operating means O for the valve means V whereby the means H can be operated to selectively direct the flow of production fluid through the pipes 15 and 16 as circumstances require and without interrupting the free flow of fluid.

The valve means V of the means H includes inlet valves 20 and 21 at the upper ends of the pipes 15 and 16 and outlet valves 22 and 23 at the lower ends of the pipes 15 and 16, respectively.

The valves are preferably simple plug valves, shiftable to open and close, and are shown as having elongate operating levers 24 to effect their opening and closing.

The operating means O is adapted to simultaneously operate the valves wherby the valves 20 and 22 related to the pipe 15 are shifted from their open to their closed positions as or at the same time the valves 21 and 23 related to the pipe 16 are shifted from their closed to their open positions, and vice-versa. With such means and mode of operation, it will be apparent that the flow of fluid can be selectively made to flow, uninterruptedly and in a full, uninterrupted column, through the pipes 15 and 16, as desired and that when the valves related to either of the noted pipes are closed, a full and complete column of the fluid is trapped and held captive in the pipe, between the valves. The operating means O can be of any suitable design and is shown as including a single, double acting hydraulic cylinder and ram unit 25 with upwardly and downwardly projecting operating shafts 26 and 26'. The shafts 26 and 26' have slotted cross-heads 27 and 27' at the upper and lower free ends, which cross-heads engage bearing pins or flowers 28 on the arms 24 of the valves, as illustrated in the drawings.

The unit 25 can be fixed to one of the pipes, such as the pipe 15, by mounting means 29.

The unit 25 is supplied with operating fluid, under pressure, by means of lines 30 and 30' communicating with the opposite ends of the cylinder and with a two way valve 31. The valve 31 is connected with a suitable source of operating fluid, under pressure, by means of a line 32.

The valve 31 is preferably an electrically operated valve and is such that it can be advantageously connected with suitable electrical or electronic monitoring means, the general nature and purpose of which will be later described.

It will be apparent that by operation of the valve 31, the valves means V is effectively operated as is desired and as is set forth above.

It is to be noted that the volumetric extent of the pipes 15 and 16, between their related valves 20–22 and 21–23 and the vertical distance between the valves is fixed and predeterminable.

Either or both of the pipes 15 and 16 can be utilized to define a test chamber. In the case illustrated, the pipe 16 defines a test chamber X, in which a fixed predetermined volume of production fluid, of predetermined and fixed vertical extent, is separated from the flow of production fluid and held captive each time the valves 21 and 23 are opened and then closed again.

The apparatus A next includes temperature sensing means T to monitor the temperature of the fluid in the chamber X, pressure sensing means P to monitor the pressure within the chamber X, weighing means W to weigh the material in the chamber and pressurizing means I to pressurize the material (compress the gas) in the chamber.

The means T preferably includes a temperature sensing device or thermo transducer carried by a nipple on the pipe 16 and has a probe projecting into the chamber X and into the fluid therein. The thermo transducer is operable to transcribe the temperature sensed on a read out dial or into an electrical signal to be transmitted to a related monitoring means.

The pressure sensing means P includes a pressure sensing transducer carried by a nipple on the pipe 16 and communicating with the chamber X therein. The pressure sensing transducer P is operable to transcribe the pressure sensed on a read out dial into an electrical signal to be transmitted to a related monitoring means.

The weighing means W that I provide is a pressure differential sensing means and includes a pressure differential sensing transducer communicating with the upper end portion of the chamber by means of a nipple 35 on the pipe 16 and a line 36 and with the lower end portion of the chamber by means of a nipple 37 on the pipe 16 and a line 38. The transducer W senses the differential hydrostatic head pressure of fluid in the chamber X between the nipples 35 and 38, transcribes that differential onto a read out dial or into a signal to be transmitted to a monitoring means.

It will be apparent that since the vertical distance between the nipples 35 and 38 is fixed, the weight of the fluid in the chamber can be readily calculated and determined from the differential in hydrostatic head pressures in the chamber at the two nipples. It is to be noted that the static pressure to which the fluid in the chamber X is subjected, does not interfere with or alter the head pressure thereon and that the differential in head pressure between the nipples of the means W will be present whether the fluid within the chamber is under 10 p.s.i. or over 200 p.s.i.

The pressurizing means I is provided to compress the free gas in the chamber X, the gas which is entrained in the fluid in the chamber and to change the volume of fluids in the chamber.

By application of Boyle's Law, in which gas pressure, volume and temperature exhibit a definite relationship, it is possible, by compressing or by expanding the free gas within the chamber to a known or predetermined volumetric extent and to note and compare the pressures and temperature differentials associated with such changing of volumetric displacement of the gas, to calculate the net gas content of the production fluid in the chamber. The equation of Boyle's Law and which is employed in carrying out the noted calculation is $$\frac{P_1 V_1}{T1} = \frac{P_2 V_2}{T2}$$

The means I consists of or comprises a tap-line 40 communicating with the chamber X, a motor driven positive displacement pump 41 operable to pump water from a suitable water supply, into the chamber X, through the line 40 and an electric operated shut-off valve 42 in the line 40.

By opening the valve 42 and operating the pump 41 to deliver a predetermined volume of water, through the line 40 and into the chamber X, the gas within the chamber is compressed, volumetrically to an extent equal to the volume of water which is added or injected into the chamber. By comparing the change in volume of gas (volume of water added) with the pressure change in the chamber created thereby and with due compensation made for differentials in temperature, the net gas content and the net liquid content of the production fluid can be readily calculated.

The valve 42 and pump 41 are connected with and can be under control of the monitoring means.

With the net content or volume of production fluid established as set forth above, with the specific gravity or density of water and of the oil in dry or anhydrous form being determinable and fixed, known factors, and with the weight of the fluid in the chamber being determined by the means W and being a known factor, the net oil and/or the net water in the production fluid in the chamber X can be readily calculated and determined, since the weight of a predetermined volume of a mixture of oil and water, the density of each of which is known and fixed, will differ and/or vary in direct proportion with the relative proportion of the two liquids. Since total weight of a mixture is equal to the sum of the weight of all of its parts, in carrying out the above, the equations employed can be, for example: $D_t V_t = D_o V_o + D_w V_w + D_g V_g$.

The apparatus that I provide can include the monitoring means referred to above. The monitoring means, shown in block diagram form in the drawings and identified by the character N, can, in its simplest form, include a board or panel 40' with suitable and appropriate visually readable dial gauges for each of the means I, T, P and W and with suitable manually operable switches related to and operable to effect desired and necessary operation of the means O and I.

In practice, the monitoring means N can be established to effect automatic, timed operation of the apparatus and to record the necessary and required data in an appropriate form for subsequent use. In such a case the means N can be suitably connected with the meter M and provided with a suitable time clock controlled circuit (not shown), operable to effect sequentially operation of the apparatus and recording of the required data, at predetermined intervals of time.

The recorded data can be set up or presented by the means N in an appropriate form for transmission to a computer V, which is programmed with appropriate software Z so the desired answers or information are presented by an output report R, from the computer. In such a case the means N, in addition to or instead of the visual and manually read out control means, would include what can be broadly referred to as data acquisition and logging means.

It is to be understood that the above referred to data acquisition and logging means, the computer and the software are only intended to indicate that the apparatus here provided is not necessarily limited to the inclusion and use of visually readable monitoring and manually operable control means, but is such that it can, if desired, be suitably automated and can be related to appropriate computer means without departing from the broader aspects and spirit of the invention.

In operation, the volume and rate of flow of production fluid is monitored by the meter M and recorded through or by the means N. When it is desired to test or analyze the fluid the means O is operated so that flow through the pipe 16 or through the chamber X is established. When the chamber X is purged of all fluid that was previously therein and is filled with a new or fresh charge of fluid, which condition can be determined by means of the meter M and means N, the means O is operated to close the valves related to the pipe 16 and open the valves related to the pipe 15, trapping and holding captive the fluid in the chamber X and at the same time maintaining uninterrupted flow of fluid in the line L, through the pipe 15.

With the fluid trapped in and fully occupying the chamber X, the temperature, pressure and weight of the fluid, at the established line pressure, is sensed by the means T, P and W and the data representative thereof is indicated and/or recorded by the means N.

With the above data obtained, the means I is operated as by means of a switch at the means N which switch can be manually operable, or under control of a suitable time clock or the like. When the means I is put into operation, water is injected into the chamber, which water displaces and compresses the gas in the fluid. The volume of water injected is limited and predetermined or is controlled and monitored so that appropriate data related thereto is acquired through and at the means N.

When the preceding is effected, the temperature, pressure and weight of the fluid in the chamber, under the new pressure environment and with the known added volume of liquid (water), are again sensed by the means T, P and W and the data pertaining thereto is acquired through and at the means N.

With all of the above data acquired and available, the net oil content, net water content and net gas content as well as the rate and/or volume of flow of the production fluid can be calculated and made known, whether by manual calculations or by the aid and assitance of a computer means or the like.

At any time after all of the above noted data is received and made available by the means N, the means O can be operated again to close the pipe 15 and open the pipe 16, to purge the pipe 16, or chamber X of the oil previously sampled and tested and prepare it for recycling of the apparatus.

While I have shown the chamber X as being established by the vertical pipe 16, it will be apparent that the chamber could be established by a tank or other suitable form of closed vessel. The employment of the vertical pipe 16 to establish or define the chamber X is preferred since it effectively establishes a column of fluid of sufficient vertical extent to establish substantial differentials in head pressures for the most satisfactory and dependable operation of the weight sensing means W.

In practice, the means I can, instead of the pump shown in FIG. 1 of the drawings, include a cylinder and ram unit for injecting a predetermined volume of fluid into the chamber X, which unit can be driven by screw or rack and pinion gear type drive means between a shaft on the ram and a drive motor, or by a driving cylinder and ram unit, such as is shown in FIG. 2 of the drawings, without departing from the spirit of this invention.

In practice, when and if it is desired to determine the volume of gas by changing the volume of the chamber and to thereby expand the gas, a cylinder and ram unit, such as is shown in FIG. 3 of the drawings can be employed.

The means O shown in the drawings could be replaced by electric operating means, such as solenoids, related to each of the valves of the means U without departing from the spirit of my invention.

The several, above noted or suggested modifications point to the fact that the particular structure described and shown in the drawings is only illustrated by one form and carrying out of my invention and that many structural changes are possible and can be made without materially altering or adversely affecting the invention.

Having described but one typical preferred form and carrying out of my invention, I do not wish to be limited to the specific details herein set forth but wish to reserve to myself any modifications or variations which may appear to those skilled in the art and which fall within the scope of the following claims:

Having described my invention, I claim:

1. An apparatus for acquisition of data for use in calculating the net volume of gas, oil and water in crude oil comprising an elongate vertical first pipe defining a sample chamber of predetermined volumetric extent, a second pipe equal in volumetric extent with the chamber defined by the first pipe, valve means at each end of the pipes and communicating with spaced sections of a crude oil flow line, operating means for the valve means to open and close communication between the flow line sections and the pipes to selectively direct crude oil into and through the second pipe or into and through the first pipe and chamber defined thereby, fluid displacement means connected with the first pipe communicating with the chamber and operable to selectively displace crude oil in the chamber a predetermined volumetric extent when the chamber is closed by said valve means and to thereby compress gas in and carried by the crude oil and to change the pressure on the crude oil in the chamber, pressure sensing and indicating means communicating with the chamber to indicate pressure data on the crude oil therein before and after the displacement means is operated, temperature sensing and indicating means communicating with the chamber to indicate temperature data of the crude oil therein before and after the displacement means is operated and fluid weighing means communicating with the chamber to weigh and indicate the weight of the crude oil in the chamber before and after the displacement means is operated.

2. The apparatus set forth in claim 1 and further including a flow meter in the flow line and indicating the flow rate and the volume of crude oil flowing through the apparatus.

3. The apparatus set forth in claim 1 wherein the pipes and the flow line are equal in cross-section whereby the entire cross-section of fluid in the flow line is conducted into and through the chamber defined by the first pipe when the valve means are operated to establish communication between the flow line and the chamber of the first pipe.

4. The apparatus set forth in claim 1 wherein the operating means operates the valve means synchronously to close communication between the first pipe and the flow line as communication is open between the second pipe and the flow line and to open communication between the first pipe and the flow line as communicating between the flow line and the second pipe is closed, whereby flow into and through the said pipes is alternately established without interruption of the flow of crude oil in the flow line.

5. The apparatus set forth in claim 1 wherein the weighing means includes a pressure differential transducer communicating with the chamber defined by the first pipe at vertically spaced points and operable to sense and compare the hydrostatic head on the crude oil at each of said points.

6. The apparatus set forth in claim 1 wherein the weighing means includes a pressure differential transducer communicating with the chamber defined by the first pipe at vertically spaced points and operable to sense and compare the hydrostatic head on the crude oil at each of said points, said apparatus further including a flow meter in the flow line and indicating the flow rate and the volume of crude oil flowing through the apparatus.

7. The apparatus set forth in claim 1 wherein the weighing means includes a pressure differential transducer communicating with the chamber defined by the first pipe at vertically spaced points, said apparatus further including a flow meter in the flow line and indicating the flow rate and the volume of crude oil flowing through the apparatus, said pipes and the flow line are equal in cross-section whereby the entire cross-section of fluid in the flow line is conducted into and through the chamber defined by the first pipe when the valve means are operated to establish communication between the flow line and the chamber.

8. The apparatus set forth in claim 1 wherein the weighing means includes a pressure differential transducer communicating with the chamber at vertically spaced points, said apparatus further including a flow meter in the flow line and indicating the flow rate and the volume of crude oil flowing through the apparatus, said pipes and the flow line are equal in cross-section of fluid in the flow line is conducted into and through the chamber defined by the first pipe when the valve means are operated to establish communication between the flow line and the chamber, said operating means operates the valve means synchronously to close communication between the second pipe and the flow line as communication is open between the first pipe and the flow line and to open communication between the first pipe and the flow line as communication is closed between the second pipe and the flow line, whereby flow into and through the pipes alternately established without interruption of the flow of crude oil in the flow line.

9. The apparatus set forth in claim 8 wherein the fluid displacement means includes a displacement fluid supply, pump means between the supply and the chamber defined by the first pipe and operable to selectively introduce a predetermined volume of displacement fluid into the chamber.

10. The apparatus set forth in claim 1 wherein the fluid displacement means includes a displacement fluid supply, pump means between the supply and the chamber defined by the first pipe and operable to selectively introduce a predetermined volume of displacement fluid into the chamber.

* * * * *

UNITED STATES PATENT OFFICE
CERTIFICATE OF CORRECTION

Patent No. 3,911,256                           Dated October 7, 1975

Inventor(s) Ray L. Jones

It is certified that error appears in the above-identified patent and that said Letters Patent are hereby corrected as shown below:

Columns 9 and 10 as shown on the attached sheets should be added, but will apply to the grant only.

Signed and Sealed this third Day of February 1976

[SEAL]

Attest:

RUTH C. MASON
*Attesting Officer*

C. MARSHALL DANN
*Commissioner of Patents and Trademarks* after the displacement means is operated, temperature sensing and indicating means communicating with the chamber to indicate temperature data of the crude oil therein before and after the displacement means is operated and fluid weighing means communicating with the chamber to weigh and indicate the weight of the crude oil in the chamber before and after the displacement means is operated.

2. The apparatus set forth in claim 1 and further including a flow meter in the flow line and indicating the flow rate and the volume of crude oil flowing through the apparatus.

3. The apparatus set forth in claim 1 wherein the pipes and the flow line are equal in cross-section whereby the entire cross-section of fluid in the flow line is conducted into and through the chamber defined by the first pipe when the valve means are operated to establish communication between the flow line and the chamber of the first pipe.

4. The apparatus set forth in claim 1 wherein the operating means operates the valve means synchronously to close communication between the first pipe and the flow line as communication is open between the second pipe and the flow line and to open communication between the first pipe and the flow line as communicating between the flow line and the second pipe is closed, whereby flow into and through the said pipes is alternately established without interruption of the flow of crude oil in the flow line.

5. The apparatus set forth in claim 1 wherein the weighing means includes a pressure differential transducer communicating with the chamber defined by the first pipe at vertically spaced points and operable to sense and compare the hydrostatic head on the crude oil at each of said points.

6. The apparatus set forth in claim 1 wherein the weighing means includes a pressure differential transducer communicating with the chamber defined by the first pipe at vertically spaced points and operable to sense and compare the hydrostatic head on the crude oil at each of said points, said apparatus further including a flow meter in the flow line and indicating the flow rate and the volume of crude oil flowing through the apparatus.

7. The apparatus set forth in claim 1 wherein the weighing means includes a pressure differential transducer communicating with the chamber defined by the first pipe at vertically spaced points, said apparatus further including a flow meter in the flow line and indicating the flow rate and the volume of crude oil flowing through the apparatus, said pipes and the flow line are equal in cross-section whereby the entire cross-section of fluid in the flow line is conducted into and through the chamber defined by the first pipe when the valve means are operated to establish communication between the flow line and the chamber.

8. The apparatus set forth in claim 1 wherein the weighing means includes a pressure differential transducer communicating with the chamber at vertically spaced points, said apparatus further including a flow meter in the flow line and indicating the flow rate and the volume of crude oil flowing through the apparatus, said pipes and the flow line are equal in cross-section of fluid in the flow line is conducted into and through the chamber defined by the first pipe when the valve means are operated to establish communication between the flow line and the chamber, said operating means operates the valve means synchronously to close communication between the second pipe and the flow line as communication is open between the first pipe and the flow line and to open communication between the first pipe and the flow line as communication is closed between the second pipe and the flow line, whereby flow into and through the pipes alternately established without interruption of the flow of crude oil in the flow line.

9. The apparatus set forth in claim 8 wherein the fluid displacement means includes a displacement fluid supply, pump means between the supply and the chamber defined by the first pipe and operable to selectively introduce a predetermined volume of displacement fluid into the chamber.

10. The apparatus set forth in claim 1 wherein the fluid displacement means includes a displacement fluid supply, pump means between the supply and the chamber defined by the first pipe and operable to selectively introduce a predetermined volume of displacement fluid into the chamber.

* * * * *